INVENTOR:
LESLIE GLICK

- FIG. 8. -

June 3, 1969 L. GLICK 3,447,242
ADJUSTABLE PATTERNS FOR TAILORING
Filed Oct. 7, 1966 Sheet 9 of 13

INVENTOR:
LESLIE GLICK
BY A. A. Saffitz
ATTORNEY

United States Patent Office 3,447,242
Patented June 3, 1969

3,447,242
ADJUSTABLE PATTERNS FOR TAILORING
Leslie Glick, Leeds, England, assignor to Prices Tailors Limited, Leeds, England
Filed Oct. 7, 1966, Ser. No. 585,050
Claims priority, application Great Britain, Oct. 12, 1965, 43,336/65
Int. Cl. A41h 3/015
U.S. Cl. 33—14    4 Claims

ABSTRACT OF THE DISCLOSURE

An adjustable pattern by which a standard pattern can be adjusted for variations in body dimensions, shape and stance and which comprises at least six portions which are interconnected for guided movement relative to one another. Figuration scales and indicators are provided for the interconnected and relatively movable adjusting portions to adapt the pattern for a regular or a nonregular figure.

---

This invention relates to adjusable patterns for tailoring whereby any "standard" pattern for a "regular" figure of a given size can be adjusted to suit the measurements of a nonregular figure and thereby render it simple for the cutter to mark and cut out the cloth according to the adjusted pattern. Such a system of adjustable patterns is fairly simple to contrive, but the object of the present invention is to go beyond this and to provide adjustable patterns which will also enable a "standard" pattern to be adjusted for variations in dimensions or measurements to cover wide combinations of figurations or body stance and thereby enabling a well-tailored garment to be produced more quickly and with less skill needed in the cutting and fitting.

The invention will be of particular advantage in made-to-measure tailoring by multiple tailoring firms, which involves the customer's measurements being sent to the factory and the finished garment being sent back with little or no opportunity for a "try-on" or for adjustments to be made at the place where the customer was measured.

The invention may be applicable to patterns for jackets, long coats, trousers, vests (waistcoats) or other garments where figuration or combinationss thereof affect the standard length relative to any particular size.

An adjustable pattern for a part of a garment according to the invention comprises a plurality of portions for the given size interconnected so that they can be adjusted to relative positions corresponding to either a regular figure for that size or to any one of a plurality of nonregular dimensions for the same size but for different figurations, and a dimension scale and indicator for the or each pair of adjacent cooperating portions for quick and accurate adjustment of the portions.

The manner of interconnecting the portions and the directions of their relative movements is devised to preserve as much as possible a continuous contour so that this contour when marked on the cloth will be easy for the cutter to follow, and the adjustment may be by straight line movement, arcuate movement or otherwise as may be appropriate or convenient having regard to the shape of the pattern. The scale of dimensions for each pair of portions may be all on one portion and the indicator on the other, and this indicator may be a line or edge or it may be the hinge line of a flap which can cover the scale during marking of the cloth and can also serve as a hand grip when adjusting the pattern.

In order that the invention may be clearly understood it will now be more fully described with reference to the accompanying drawings which illustrate examples of patterns embodying the invention and for the various parts of a jacket, for trousers and for a vest and in which drawings.

Figures 1, 2:
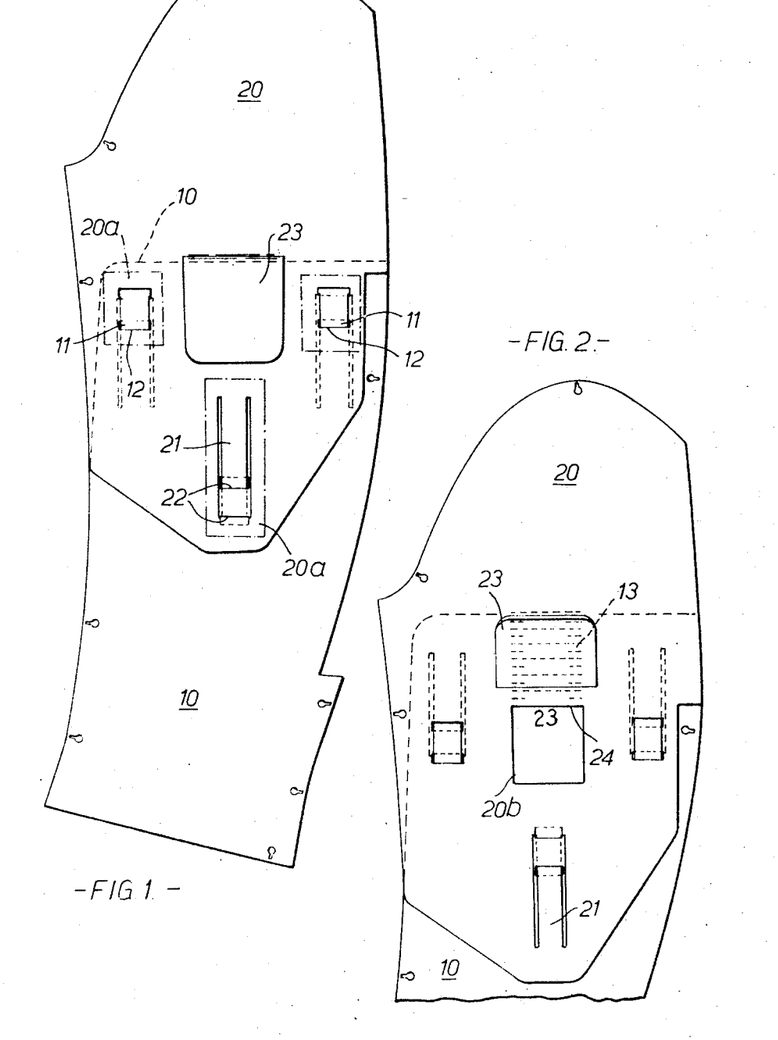
FIGURE 1 is a plan of the top sleeve pattern for a jacket fully extended.
FIGURE 2 is a broken view similar to FIGURE 1 but showing the pattern contracted.
Figure 3:
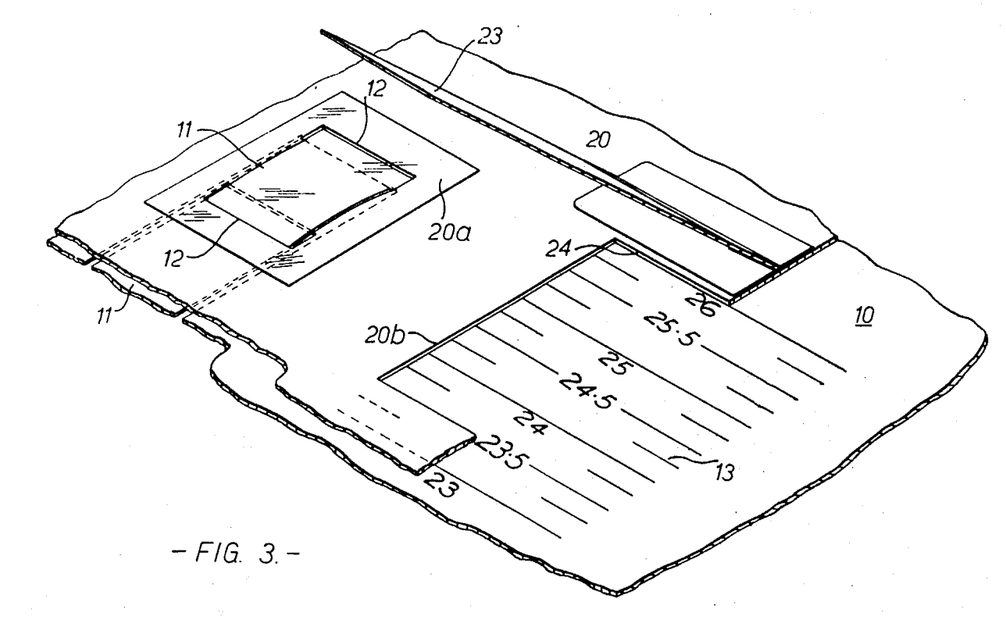
FIGURE 3 is an enlarged detail perspective view of the scale and indicator on the pattern shown in FIGURE 1.

Referring to FIGURES 1 to 3, which embody the invention in a simple form, the top sleeve pattern consists of a lower and an upper portion 10, 20 slidably interconnected in partly overlapping relationship by straps 11, 21 passing through double slots 12, 22 whereby the overall length of the pattern can be adjusted to a limited extent. Each of the straps 11, 21 is formed by making parallel slits in the material, cutting across one end to form a tongue and, after threading this tongue through the double slot, adhering or otherwise securing the cut end of the tongue to the pattern again. In order to ensure free relative movement between the straps and slots upon repeated use of the pattern with lay marking by the spray method, they are preferably protected by covers 20a (shown only in FIGURES 1 and 3) which may be transparent or opaque but which are adhered round their margins only to the topmost portion 20.

The portion 10 bears a scale 13 of sleeve lengths visible through an aperture 20b, and this scale and aperture are covered in all positions of adjustment by a flap 23 hinged to portion 20, the upper edge 24 of the aperture serving as the indicator for cooperating with the scale. The chest size and style may be marked on the pattern adjacent the scale.

Adjustment to shorten the pattern is made by holding the main part of portion 10 down firmly upon a table top with one hand, grasping the raised flap 23 with the other hand and sliding portion 20 over portion 10 until the aperture edge 24 registers with the desired dimension on the scale. To lengthen the pattern it is only necessary to grasp the portions one in each hand and pull them apart to their full extent (see FIGURES 1 and 3), then lay the pattern on the table and shorten it to the desired degree as described above.

This pattern can be laid on the cloth and the latter chalked for cutting, but where lay marking is done by a travelling paint or like spray the flap protects the scale from the spray.

It will be seen that the sliding connection between the two portions 10, 20 is controlled by the direction of the straps and slots relative to the lateral boundaries of the two portions so as to maintain continuity of the lateral contour at all positions of adjustment, thereby ensuring the desired figuration in spite of length variations.

Referring to FIGURES 4 to 7, the jacket back pattern consists of a lower portion 30 and a central portion 40 slidably interconnected by straps 31, 41 and double slots 32, 42 in the manner described for FIGURE 1. A lower yoke portion 50 is pivoted on portion 40 at the "top of the side seam" position at 55 and guided for arcuate movement thereon by headed pins 51 working in slots 47. An upper yoke portion 60 is pivoted on portion 50 at the back pitch position 65 and guided for arcuate movement thereon by headed pins 61 working in slots 57.

Figure 4:
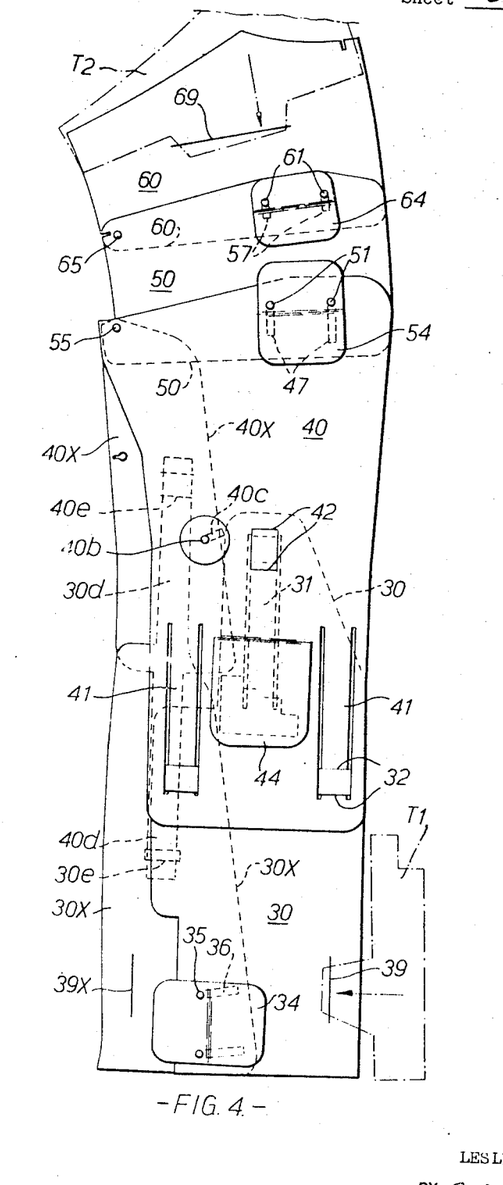
FIGURE 4 is a plan of a jacket back pattern fully extended.
Figure 5:
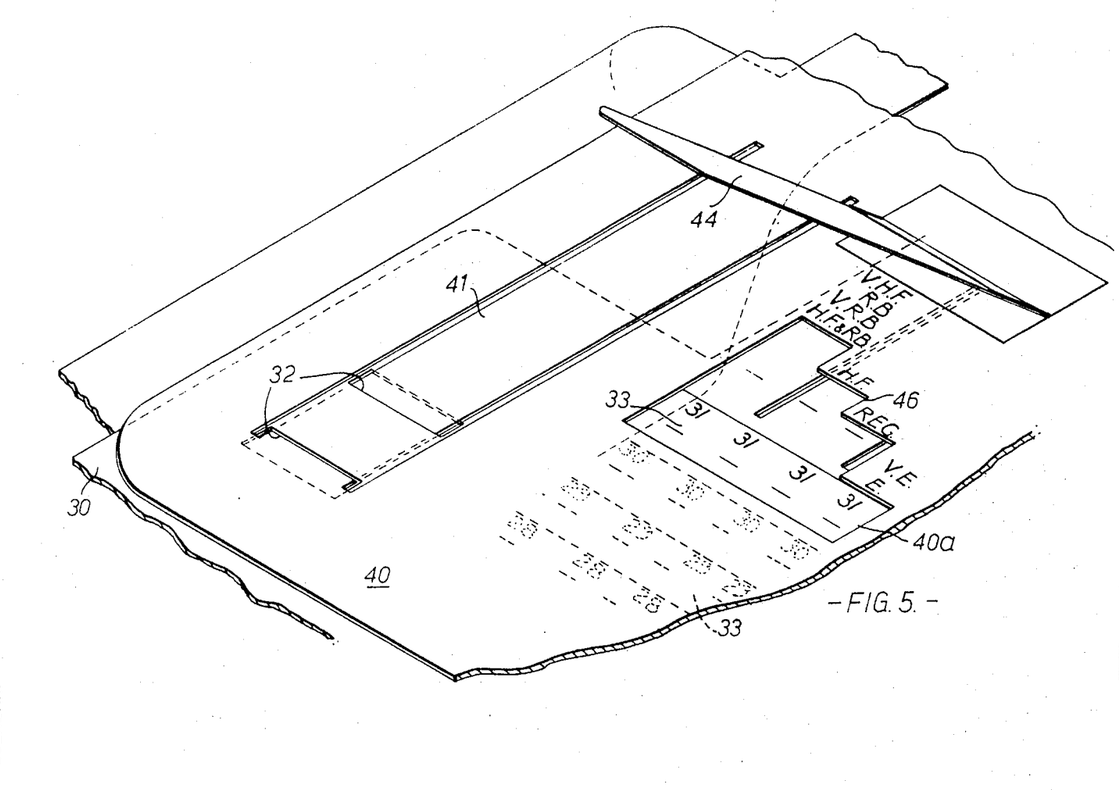
FIGURES 5, 6 and 7 are enlarged detail perspective views of the scales and indicators on the pattern shown in FIGURE 4.

There is an overall length scale 33 on portion 30 which has four identical sets of measurements arranged side by side, and with this scale cooperates the stepped indicator edge 46 of an aperture 40a which can be covered by a flap 44. The steps of this indicator edge 46 are positioned longitudinally of the pattern to represent the appropriate lengths respectively relative to figurations which are either: (1a) "Very Head Forward" (VHF), (b) "Round Back" (RB), (c) "Very Round Back" (VRB), or (d) "Head Forward and Round Back" (HF and RB); (2) "Head Forward" (HF); (3) "Regular" (REG), (4a) "Very Erect" (VE) or (b) "Erect" (E).

Figure 6:
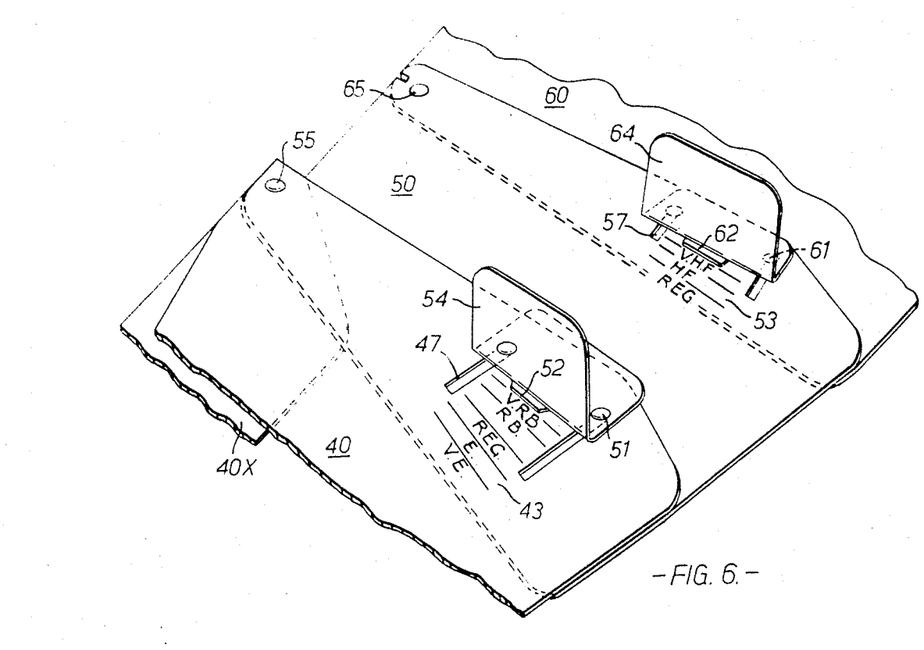
Figure 7:
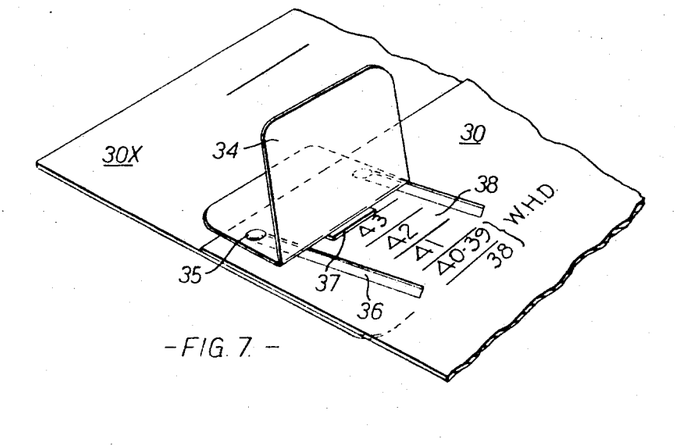

Two further scales 43, 53 bear similar indications of various figurations, and with these cooperate respectively flaps 54, 64 which are secured on portions 50, 60 by the headed pins 51, 61 and which carry indicator edges 52, 62 to cooperate with the scales. By means of these two scales the lower and upper yoke portions 50, 60 can be adjusted to suit the desired figuration independently of the length adjustment made by use of scale 33. It will be understood that this length adjustment for any particular jacket size will vary according to the desired figuration, these variations being indicated by the stepped edge 46 which guides the operator in making the correct adjustment without difficulty.

This pattern includes a lower side portion 30X and an upper side portion 40X which together delineate the side seam. Portion 40X is pivoted at 55 to portion 40 and guided for arcuate movement relative to the latter by a headed pin 40b and slot 40c. It is also slidable longitudinally along with portions 40, 50 and 60 relative to portions 30 and 30X by means of straps 30d, 40d passing through double slots 40e, 30e respectively. The swinging adjustment of portions 30X and 40X about point 55 is produced by operating a flap 34 secured to portion 30X by headed pins 35 working in slots 36 in portion 30, the flap having an indicator edge 37 to cooperate with a seat girth scale 38. This scale has dimensions for varying seat girths, with alternatives marked WHD for use if hip darts are to be allowed for.

In using this pattern the two yoke portions 50, 60 are adjustable angularly for the desired figuration, and then these along with portions 40, 40X are adjusted longitudinally using the scale 33. Finally the side portions 30X, 40X are adjusted angularly as a whole using the scale 38 to give the pattern the desired seat girth and automatically adjusting the waist girth in correct proportion to the seat girth, these seat and waist dimensions being further items of figuration for which the pattern allows. With this pattern, as with that previously described, it will be noted that the relative movements between the different portions are arranged to take place in such directions as to maintain substantially a continuity of the lateral contour at all positions of adjustment.

Referring to FIGURES 8 to 12, the jacket forepart pattern consists mainly of a lower portion 70, a central portion 80, an upper portion 90 and a shoulder portion 100. Portions 70 and 90 are slidably itnerconnected by three sets of straps 71, 91, 91 and double slots 92, 72, 72 in the manner described with reference to the previous figures. Portion 80 is slidably mounted upon portion 90 by four sets of straps 81 and double slots 92a. The shoulder portion 100 is pivoted on portion 90 at the "top of the side seam" at 105 and guided for arcuate movement by headed pins 101, 102 working in slots 96, (see FIGURE 12) 97 respectively.

There is an overall length scale 73 and a pocket and dart location scale 93 similar to the scale 33 of FIGURE 5. These are shown separately in FIGURES 10 and 11, and cooperating with them are hinged flaps 94, 84 and stepped indicator edges 95, 85 respectively. There is a figuration scale 93X, shown separately in FIGURE 12, for adjusting the shoulder portion 100 by means of hinged flaps 104 with indicator edge 103.

The pattern also includes a lower side portion 70X and an upper side portion 90X which delineate the side seam and which are shaped and operate similarly to portions 30X and 40X of the jacket back shown in FIGURE 4. Portion 90X is guided for angular movement about pivot 105 by headed pin 90b and slot 90c and is interconnected with portion 70X by means of straps 70d, 90d and double slots 90e, 70e respectively. Portion 70X is interconnected with portion 70 by headed pins 75 working in slots and has a hinged flap 74 for moving an indicator edge over a seat girth scale which is identical with scale 38 shown in FIGURE 7.

In portion 80 there are a number of perforations of T and other shapes through which the cloth below the pattern can be marked to indicate the positions of the side pocket, the underarm dart and the lapel position, while a further perforation 87 cooperates with one 97X in portion 90 to indicate the length of the breast dart which will thus be adjusted in length in correct proportion when part 80 is adjusted on part 90. Further perforations 106 in part 100 indicate the breast pocket position. All these perforations are kept unobstructed in all adjusted positions of the portions of the pattern by the provision of suitable apertures or cut-away parts in the overlying or underlying portions of the pattern as clearly shown in FIGURES 8 and 9.

Figure 8:
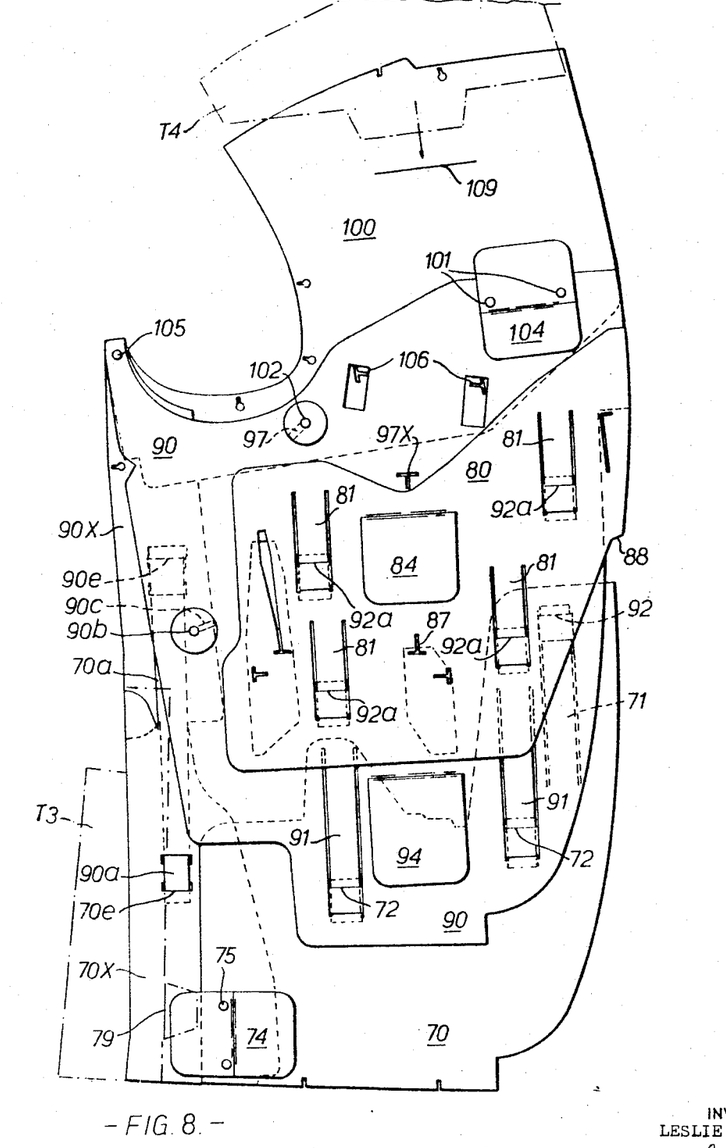
FIGURES 8 and 9 are respectively a plan and under-plan of a jacket forepart pattern fully extended.
Figure 9:
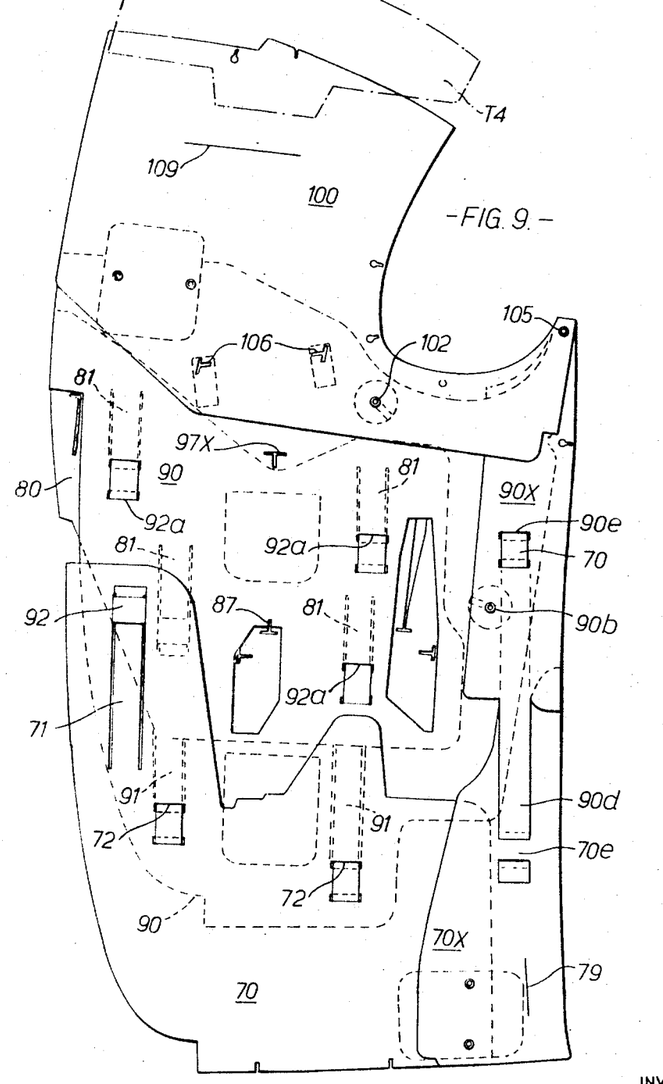
Figures 10, 11, 12:
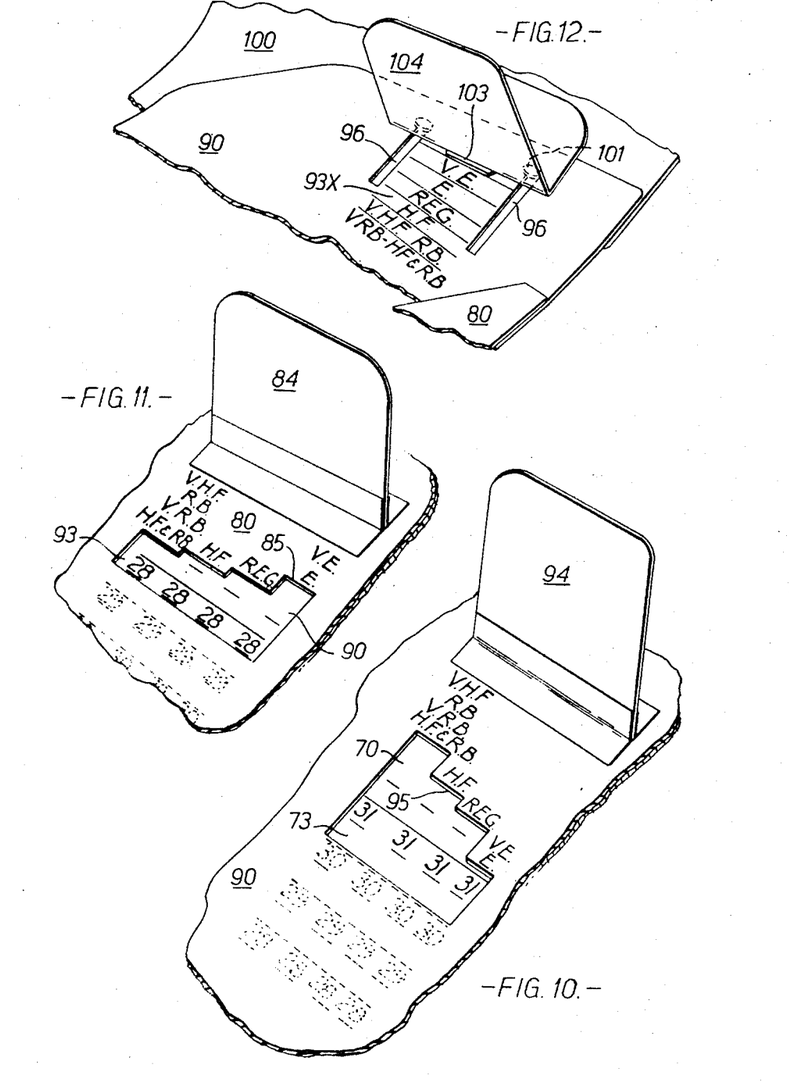
FIGURES 10, 11 and 12 are enlarged detail perspective views of the three main scales and indicators on the pattern shown in FIGURE 8.

In adjusting this pattern, the shoulder portion 100 is adjusted relative to portion 90 by the figuration scale 93X, moving the breast pocket position 106 accordingly. Then these two portions with side portion 90X are adjusted together relative to portions 70 and 70X by the overall length scale 73 to give the correct length of jacket in relation to the chosen figuration. Next portion 80 is adjusted relative to portion 90 by the pocket and dart location scale 93 to adjust correspondingly the positions indicated by the various perforations and also to adjust the lower end 88 of the lapel position. It will be seen from FIGURES 10 and 11 that on scale 93 the graduations extend in the opposite direction to those on scale 73 so that when the whole pattern is fully extended the lower part of portion 80 will overlap the flap 94. For this reason portion 80 is shown in FIGURES 8, 9 and 11 in its contracted position. Finally the side portions 70X, 90X are adjusted angularly as a whole by the seat girth scale which automatically adjusts the waist girth proportionally.

Again it will be seen that the various portions are so shaped and arranged to be moved that a substantial continuity of the lateral contour of the pattern is maintained at all positions of adjustment.

If desired the pattern for the coat facing may also be made adjustable as to length in relation to the desired figuration by a similar arrangement of slidably interconnected portions; for example three portions with two scales, and this pattern might be incorporated with the jacket forepart pattern already described.

Variations in style details may also be made on the jacket back and forepart patterns by the provision of slits 39, 39X, 69 (see FIGURE 4) and slits 79, 109 (see FIGURE 8) to receive the tongues of detachable templates such as T1, T2, T3, T4 to provide for side or centre vents and for long neck or sloping shoulders.

Referring to FIGURES 13 to 18, the top side trouser leg pattern consists mainly of a lower portion 110, a central portion 120, and an upper portion 130. Portion 110 is slidable lengthwise relative to portion 120 through three straps 111 and three double slots 122 by means of a hinged flap 114, setting the indicator edge 115 to the overall length scale 123 (see FIGURE 15). Portion 130 is similarly slidable relative to portion 120 through three straps 121, 131 and three double slots 132, 122 respectively by means of a hinged flap 134, setting the indicator edge 135 to the trouser rise scale 123X (see FIGURE 16).

Figures 15, 16, 17, 18:
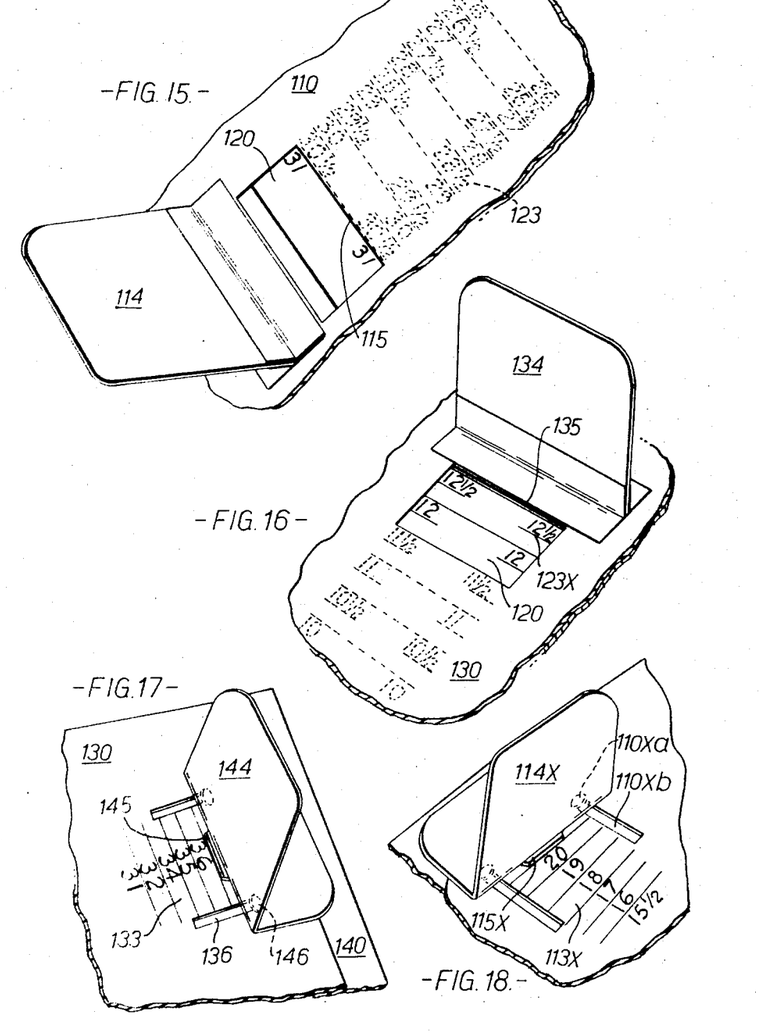
FIGURES 15, 16, 17 and 18 are enlarged detail perspective views of the scales and indicators on the pattern shown in FIGURES 13A, 13B.

A waist portion 140 is pivoted at 141 on upper portion 130 and can be adjusted angularly by the hinged flap 144 guided by headed pins 146 and slots 136, setting the indicator edge 145 to the waist scale 133 (see FIGURE 17).

A lower and an upper inside leg portion 110X, 120X are pivoted at 124 on upper portion 30 for angular adjustment guided by headed pins 110Xa, 120Xa and slots 110Xb, 120Xb respectively, this adjustment being done by means of hinged flap 114X setting the indicator edge 115X to the bottom width scale 113X (see FIGURE 18). To enable the portion 110X to slide longitudinally relative to portion 120X when portions 110 and 120 are adjusted, there are straps 110Xc, 120Xc and double slots 120Xd, 110Xd respectively.

Figures 13A, 13B, 14:
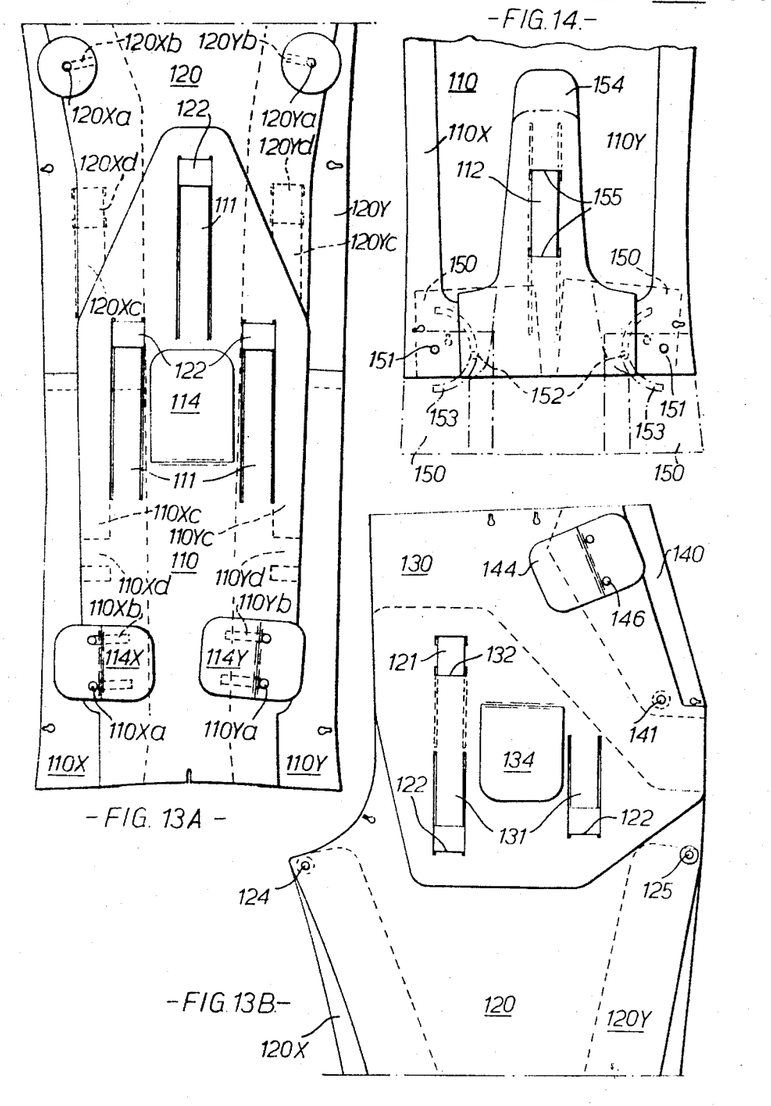
FIGURES 13A and 13B are toegther a plan of the top side leg pattern for a pair of trousers, shown fully extended.
FIGURE 14 is a plan showing an auxiliary turn-up pattern incorporated with the lower end of the pattern shown in FIGURE 13A.

The other side of the pattern is similarly provided with a lower and an upper side seam portion 110Y, 120Y pivoted at 125, guided by pins 110Ya, 120Ya and slots 110Yb, 120Yb, with flap 114Y covering an identical bottom width scale, and slidably interconnected by straps 110Yc, 120Yc and double slots 120Yd, 110Yd.

The different portions of this pattern may be adjusted in any order but conveniently from the waist portion downwards, scales 123X and 133 giving adjustment for figuration and scale 123 giving overall length adjustment relative to the figuration. The inside leg portions and side seam portions are then adjusted equally for the bottom width. Again it will be seen that the lateral contour of this pattern is substantially maintained continuous to enable marking of the cloth to be done easily and accurately. Even the adjustment for bottom width does not spoil the contour because the slide connections between the upper and lower leg portions and the upper and lower side seam portions are appropriately inclined to the direction of the main slide connections 111, 122.

This pattern as shown in FIGURE 13A is for a plain bottom, but it can be arranged to serve also for a turn-up bottom as shown in FIGURE 14 by pivoting two side extensions 150 at 151 to the bottoms of the two portions 110X, 110Y so that they can be swung down through 90° into the positions shown by the dot-and-dash lines and limited by headed pins 152 and quarter-circle guide slots 153. The extended lower edge of the turn-up is completed by a central extension 154 slidably mounted on portion 110 by a strap 112 and double slot 155, this central extension being shown in full lines as retracted and in dot-and-dash lines as extended.

Referring to FIGURES 19 to 23, the vest pattern consists of an upper portion 160, a centre portion 170, a front lower portion 180, a rear lower portion 190, a "bottom run" portion 200, and an upper and a lower front opening portion 210, 220. The manner of connecting and adjusting these portions, and the scales used therefor, are generally similar to those already described above for the jacket forepart, but special features will be pointed out in the following brief description.

The upper portion 160 includes the armhole, shoulder seam and neck point, and it is pivoted on the centre portion 170 at the "top of the side seam" 165. It can be adjusted angularly by the hinged flap 164 guided by pins 166 and slots 176, using the figuration scale 173 (see FIGURE 23).

Figure 21:
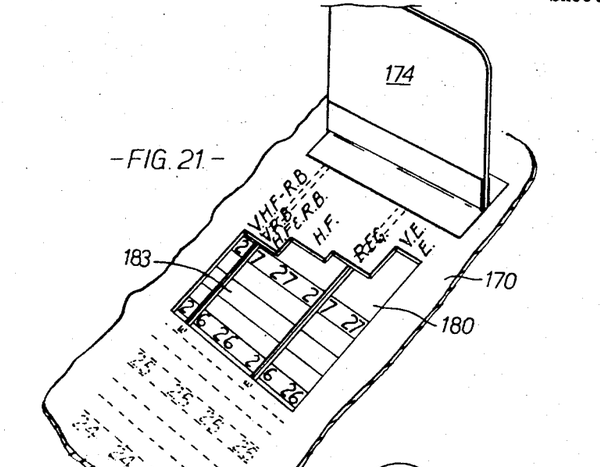
FIGURES 21, 22 and 23 are enlarged detail perspective views of three of the scales and indicators on the pattern shown in FIGURE 19.

The front lower portion 180 is slidably connected to and behind the centre portion 170 through straps 171, 181 and double slots 182, 172, adjustment being by hinged flap 174 using the overall length scale 183 (see FIGURE 21).

Figure 22:
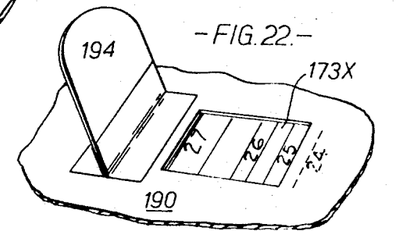
Figure 23:
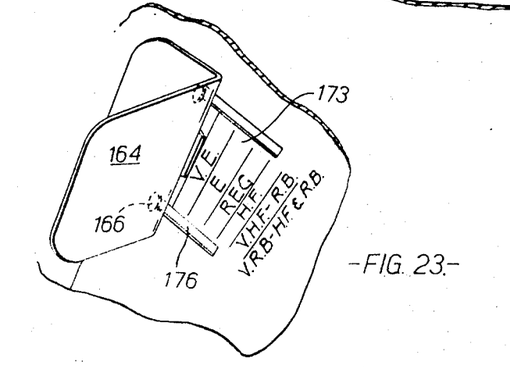

The rear lower portion 190 is slidably connected to and in front of portion 170 through straps 175, 195 and double slots 197, 177 and is adjustable by flap 194 using the side seam length scale 173X (see FIGURE 22). This portion 190 carries a dart aperture 191, and with the portion 170 it forms the side seam. It also has pivoted to it at the bottom of the side seam at 205 the bottom run portion 200 which is connected pivotally and slidably at its other end by a headed pin 206 and straight inclined slot 186 to portion 180.

Figures 19, 20:
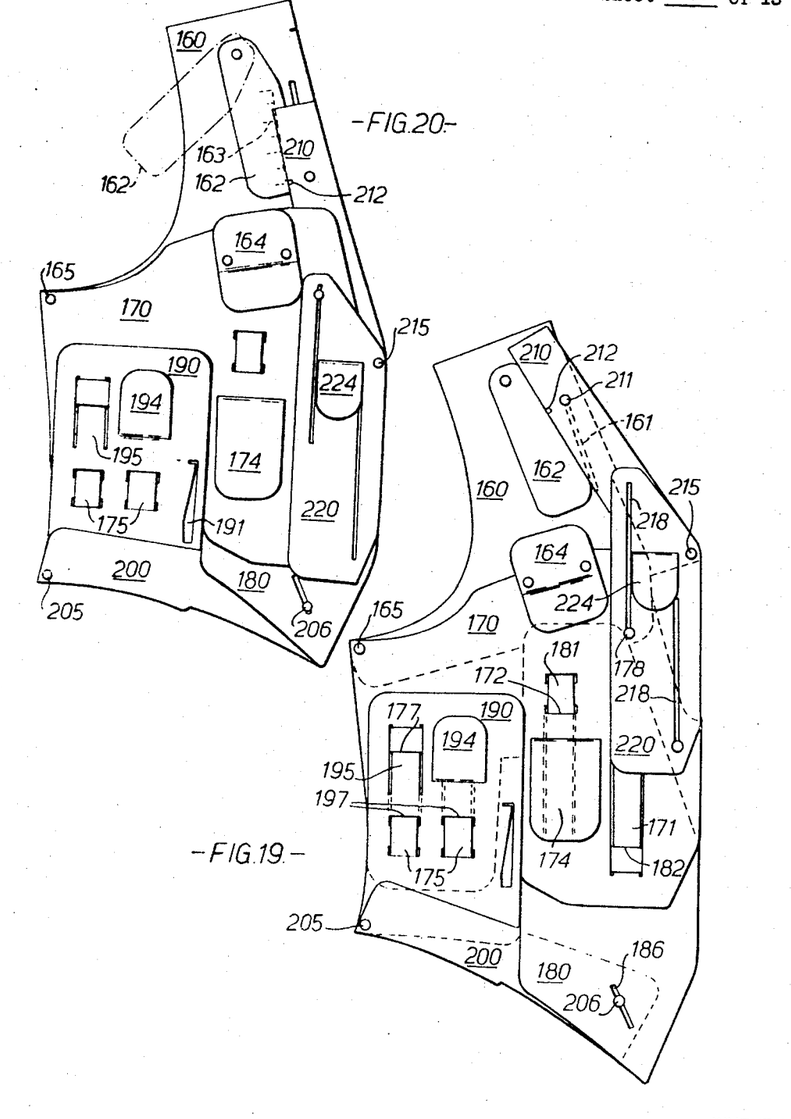
FIGURE 19 is a plan of a vest pattern fully extended.
FIGURE 20 is a view similar to FIGURE 19 but showing the pattern contracted.

The front opening portions 210, 220 are pivoted together at 215, and are slidably connected respectively to portions 160, 170 through pins and slots 211, 161 and 178, 218, being moved by flap 224 (which acts merely as a handgrip) so that an indicator notch 212 can be set to the front opening scale 163. This scale is shown in the figures covered by a pivoted flap 162 to protect it from paint, but can be swung clear as indicated in FIGURE 20 when adjusting the pattern.

This pattern is used as follows:

(1) The upper portion 160 is adjusted relative to the centre portion 170 using the figuration scale 173, the front opening upper portion 210 swinging about its pivot 215.

(2) The two front opening portions are adjusted to the desired dimension on the front opening scale 163 the upper one 210 again swinging about its pivot to give a correct line.

(3) All portions except the front lower one 180 are adjusted relative to the latter using the appropriate set of dimensions on the overall length scale 183 in relation to the figuration setting.

(4) The rear lower portion 190 is adjusted on the centre portion 170 using the side seam length scale 173X to give the correct length of side seam relative to the overall length. This moves the dart aperture to the correct position. It also swings the bottom run portion 200 angularly to give a correct bottom line which varies in length and general inclination according to the overall length and side seam length, as will be clearly evident from a comparison of FIGURES 19 and 20.

It will be observed again that the several portions are interconnected in such a way that in all stages of adjustment the contour of the pattern is maintained substantially continuous so that even after lay marking by spraying there is little or no need for the cutter to deviate from the marked contour on the cloth.

The above described patterns may be constructed from cardboard, laminated paper, sheet metal, synthetic plastic sheet or like semirigid material, preferably inherently capable of withstanding repeated lay marking by the spray method, or so treated.

Whilst the numerals shown on the various scales in the drawings represent inches and parts thereof, it is to be understood that these could be replaced by the corresponding metric dimensions.

I claim:

1. An adjustable pattern for a part of a garment which fits to the upper part of the body of a person and which embodies the top of the side seam position and by which a standard pattern can be adjusted for variations in at least some of the dimensions for adapting it to cover a plurality of combinations of figuration or body stance, said pattern comprising in combination at least six portions for a given size of garment interconnected for guided movement relative to one another including a lower portion and a central portion relatively moveable by straight line motion lengthwise of the pattern, at least one upper portion pivoted to one of said other portions at the top of the side seam position with arcuate guide means for guiding said upper portion in its arcuate movement about said pivotal point, and a lower side portion and an upper side portion which together delineate the side seam, guide means interconnecting said side portions with one another and with said lower portion whereby said lower side portion is moveable by straight line motion relative to said upper side portion lengthwise of the pattern, said upper side portion being pivotally mounted at the said top of the side seam position to enable said two side portions to move as a whole with an arcuate motion, and a plurality of figuration scales and indicators for said several interconnected and relatively moveable portions for adjusting the latter to relative positions corresponding to either a regular figure for that garment size or to any one of a plurality of nonregular dimensions for the same size but for different figurations.

2. An adjustable pattern for a jacket back as claimed in claim 1 wherein said figuration scales include a sleeve length scale, an overall length scale for relative adjustment between said lower portion and said central portion, a lower yoke scale for relative arcuate adjustment between said central portion and a first one of said pivoted upper portions constituting a lower yoke portion, an upper yoke scale for relative accurate adjustment between said first pivoted upper portion and a further pivoted upper portion constituting an upper yoke portion, and a seat girth scale for relative adjustment between said lower portion and said side portions.

3. An adjustable pattern for a jacket forepart as claimed in claim 1, wherein said figuration scales include an overall length scale for relative adjustment between said lower portion and a first one of said pivoted upper portions, a pocket and dart location scale for relative adjustment between said central portion and said last mentioned upper portion, a shoulder scale for relative arcuate adjustment between said first pivoted upper portion and a further pivoted upper portion constituting a shoulder portion, and a seat girth scale for relative adjustment between said lower portion and said side portions.

4. An adjustable pattern for a vest as claimed in claim 1, wherein said figuration scales include an upper scale for relative adjustment between said central portion and one of said pivoted upper portions which includes an armhole, shoulder seam and neck point, an overall length scale for relative adjustment between said central portion and a front lower portion, and a side seam length scale for relative adjustment between said central portion and a rear lower portion which combines with said central portion to delineate the side seam, there being also an upper and a lower front opening portion pivoted together and slidably connected respectively to said last mentioned pivoted upper portion and said central portion and a front opening scale for relative sliding adjustment between said front opening portions moving as one and said upper portion and said central portion.

References Cited
UNITED STATES PATENTS

| | | | |
|---|---|---|---|
| 432,322 | 7/1890 | Moriarty | 33—14 |
| 516,828 | 3/1894 | Lutz | 33—14 |
| 1,049,536 | 1/1913 | Rothenberger et al. | 33—14 |
| 1,783,004 | 11/1930 | Smith | 33—14 |

WILLIAM D. MARTIN, JR., *Primary Examiner.*